G. R. BENNETT.
COTTON PICKING AND CLEANING.
APPLICATION FILED NOV. 15, 1920.

1,398,930.

Patented Nov. 29, 1921.
7 SHEETS—SHEET 1.

FIG.1.

WITNESSES
J. Hetel Bradley

INVENTOR
George R. Bennett
by Daniel S. Wolcott
Atty

UNITED STATES PATENT OFFICE.

GEORGE R. BENNETT, OF GLEN OSBORNE, PENNSYLVANIA.

COTTON PICKING AND CLEANING.

1,398,930.   Specification of Letters Patent.   Patented Nov. 29, 1921.

Application filed November 15, 1920. Serial No. 424,115.

*To all whom it may concern:*

Be it known that I, GEORGE R. BENNETT, residing at Glen Osborne, in the county of Allegheny and State of Pennsylvania, a citizen of the United States, have invented or discovered certain new and useful Improvements in Cotton Picking and Cleaning, of which improvements the following is a specification.

In hand picking of cotton the lint with the seed is drawn from the boll by the fingers and transferred to the other hand, where a plurality of gathers are wadded together and the compacted ball then thrown into a bag or basket. It frequently happens that the husk, or portions thereof, burs, leaves and not fully opened bolls are picked and wadded together with the gathers of lint. Lint picking or gathering machines are generally constructed to gather the lint from the plurality of bolls before they are discharged or are forced from the gathering device, so that the lint and foreign materials are wadded together. Other machines discharge each gather as it is made, into receptacles where the gathers and foreign material become compacted before being taken to the gin or other cleaning machine.

It is characteristic of all of these methods, that before being subject to cleaning the lint has embodied therein a very considerable amount of foreign material and that the lint must be opened up effectually before the foreign materials such as leaves, burs, etc., and the lint can be segregated.

The object of the invention described herein is to provide for the separating of the lint from the seeds, hulls, pieces thereof, leaves, etc., which are collected with the lint as a step in the picking or gathering operation and prior to ginning and preferably before the gathers of lint from the plurality of bolls have been compacted and thereby become entangled with the foreign materials picked up during the picking operation. It is a further object of the invention to provide pneumatic means for gathering the lint from the bolls and delivering the gathers separately to cleaning and ginning mechanisms. The invention is hereinafter more fully described and claimed.

In the accompanying drawings forming a part of this specification.

Figure 5:
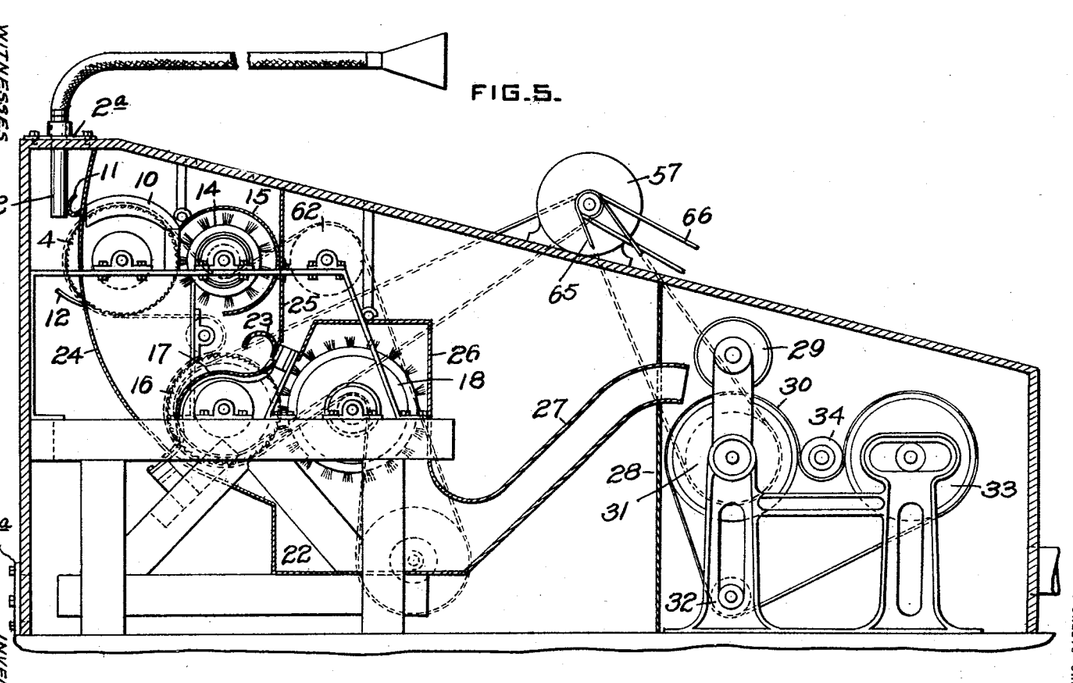
Fig. 5 is a sectional elevation of the entire mechanism.

In the practice of the invention the lint is drawn from the bolls through a plurality of flexible pipes 1 which have their inner ends connected to nozzles 2 projecting into the case or shell 3 of the machine and into suitable proximity of the cleaning disks 4. The movement of the lint through the pipes 1 being affected by atmospheric pressure, a vacuum being maintained in the case or shell by a fan 5 or other suitable exhaust apparatus. As shown in Fig. 5, the cleaning and ginning mechanisms are intermediate the delivering ends of the nozzles 2 and the outlet to which the fan is connected and hence lint will be subjected to a current of air which will assist in the movement of the lint through the mechanisms. It is preferred that the nozzles 2 should be adjustably mounted and to this end each nozzle passes through a plate $2^a$ movably mounted on the shell and provided with a sleeve through which a set screw for holding the nozzle in the desired vertical position, is passed.

Figure 6:
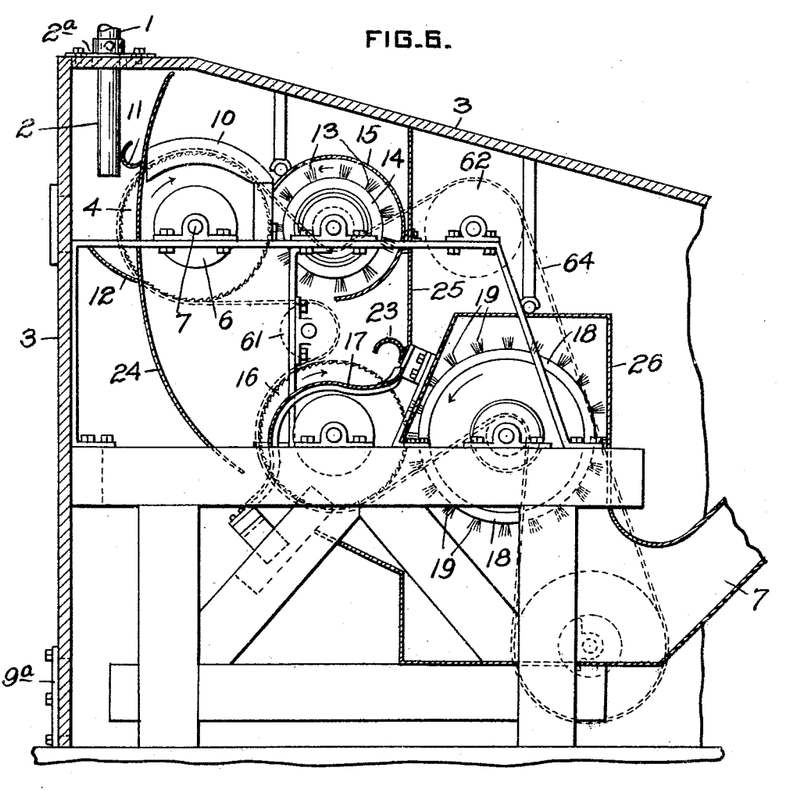
Fig. 6 is a sectional elevation on an enlarged scale of the cleaning and ginning mechanism.
Figure 7:
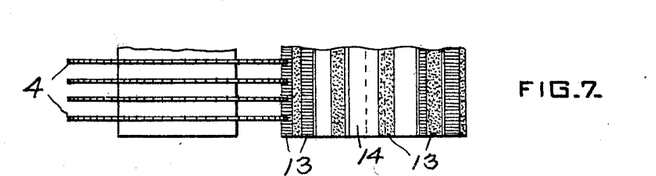
Figs. 7 and 8 are front and side elevation of the cleaning members.
Figure 8:
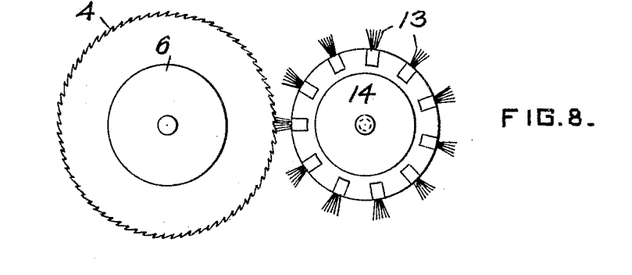
Figure 9:
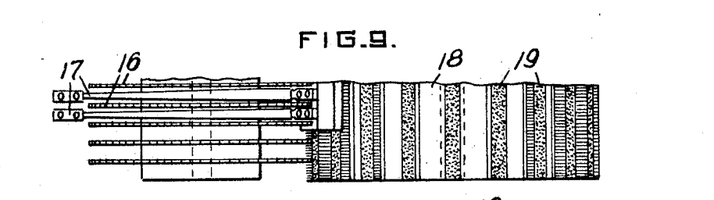
Figs. 9 and 10 are similar views of the ginning mechanism.
Figure 10:
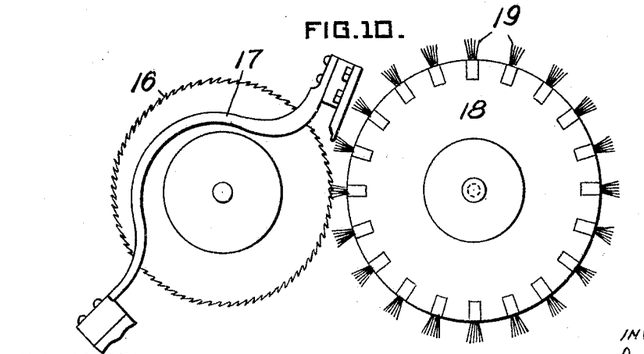

As shown in Figs. 5 and 6 the discharge ends of the nozzles are so adjusted with reference to the cleaning roll that the lint passing downwardly from the nozzles will move in such proximity to the peripheries of the toothed disks 4 composing the cleaning rolls that the lint will be caught by the teeth and pulled upwardly and out of the stream of air entering through the nozzles. As will be seen by reference to Figs. 3, 4, 7, and 8, the cleaning roll consists of a plurality of disks 4 having their perimeters provided with sharp teeth adapted to engage the fibers of the lint. These disks and their spacing washers 6 are mounted on a shaft 7 one end of which projects through the side walls of the shell or case for the reception of the driving wheel or pulley 8. As it is desired that air should enter the shell or case, only through the nozzles 1, a suitable packing is provided where the shaft 7 and other parts hereinafter referred to, pass through the shell as indicated at 9. This roll is so rotated that its periphery adjacent to the line of movement of the lint from the nozzles will move upward or opposite the direction of the stream of air and lint. The stream of air will have considerable velocity as it flows tangentially of the disks so that any leaves adherent to the lint will be blown away from the lint which is caught by the teeth of the disks and moved out of the path of movement. It has been found that by the conjoint action of the stream of air and the pull exerted by the toothed disk, will effect a further opening up of the gathers. The teeth of the disks will not engage the leaves or other foreign materials entering with the lint so that they can be blown down by the stream of air. It has also been found that not only is there no engagement of the leaves, etc., by the teeth of the disk, but in case such foreign material is struck by the teeth it will be thrown away therefrom. Any foreign material separated from the lint by the conjoint action of the stream of air and cleaning roll will settle down to the bottom of the case or shell from which it can be removed from time to time through a manhole.

The cleaning roll is rotated at a very high speed and in order to prevent any of the lint being thrown into the space above the cleaning roll, a shield 10 is arranged above the same as shown in Figs. 5 and 6 and a stop 11 is arranged above the point where the lint, etc., meets the roll to prevent any foreign matter entering with the lint being thrown above the cleaning roll and dropped back onto the same and becoming again entangled. As some of the lint may pass down without being caught by the teeth of the rolls, a lip 12 is so arranged as to deflect lint in toward the roll.

The lint is removed from the cleaning rolls by brushes 13 arranged on the periphery of a roll 14 mounted in the case or shell, that the brushes will overlap for a short distance the disks of the cleaning roll. One of the journals as 14ª projects outside the shell and on the projecting portion is secured a driving pulley. As this doffing roll is rotated at a much higher speed than the cleaning roll, the lint will be disengaged from the roll and drop down onto the ginning roll. The doffing roll is also provided with a shield 15 which extends from the shield 10 around the roll to a line passing through the axes of the doffing and ginning rolls, as shown in Fig. 6, so that the lint will drop onto the upwardly moving portion of the ginning roll. The ginning roll mechanism consisting of the roll having toothed disks 16 arranged in spaced relation on a shaft, the rails 17 arranged between the disks and the doffing roll 18 provided on its periphery with brushes 19 for sweeping the lint off the disks 16. One end of the shafts of the ginning and doffing rolls project outside the case or shell and on these projecting ends are secured sprocket wheels or pulleys 20 and 21. By the conjoint action of the toothed disks or saws 16 and the rails 17, the lint is separated from the seed, the lint being carried between the rails by the teeth from which it is removed by the brushes 19, from which it drops into the box 22. The seeds are pushed up into the roll box 23 and moving laterally will roll down the rails into the bottom of the case or shell and are removed with other foreign material through the manholes 9ª.

In order to utilize the currents of air flowing from the nozzles to the fan, in moving the lint through the cleaning and ginning mechanisms, suitable partitions 24 and 25 are arranged in the case or shell, such partitions extending to the walls of the case or shell. The partition 24 extends from a line in the rear of the nozzles 2 down in front of the cleaning roll, under the ginning roll to the front wall of the box 22 under the doffing roll. As shown in Fig. 6, this partition is slotted so as to permit the projection of the cleaning disks therethrough. The partition 25 extends up from the roll box 23 to the shield 15 but may extend up to the top of the shell or case. The upper portion of the doffing roll is inclosed by a shield box 26 which has its rear wall connected to the upper wall of the chute 27, the lower wall of the chute extending from the bottom of the box 22. While not necessary, it is preferred to provide a partition 28 in front of the baling mechanism, the chute being extended therethrough as shown in Fig. 5. By means of the described arrangement of baffles the main current or flow of air will be between the disks of the cleaning roll, the disks of the ginning roll, the box 22 through the chute to the compartment in which the baling mechanism is located. The movement of the lint through the chute will be somewhat accelerated by the action of the brushes of the doffing rolls.

While any suitable construction of baling mechanism may be employed, that shown is preferred. The currents of air carry the lint through the chute in between the roller 29 and a belt 30 passing around roller 31, guide roller 32 and roller 33. The belt is made sufficiently long that it will loop down between rollers 31 and 33 and in this loop a round mandrel 34 is loosely supported. As the lint is fed between roller 29 and belt 30, it is flattened out and carried by the belt under the mandrel and by the rotation of the latter the layer of cotton will be wrapped around the mandrel forming a circular bale.

It has been found that the gathers follow a straight course or path through the cleaning and ginning mechanism and the extent of separation of two gathers entering through the same nozzle is maintained throughout; so that there is the same individual treatment as set forth in the application above referred to.

Figure 1:
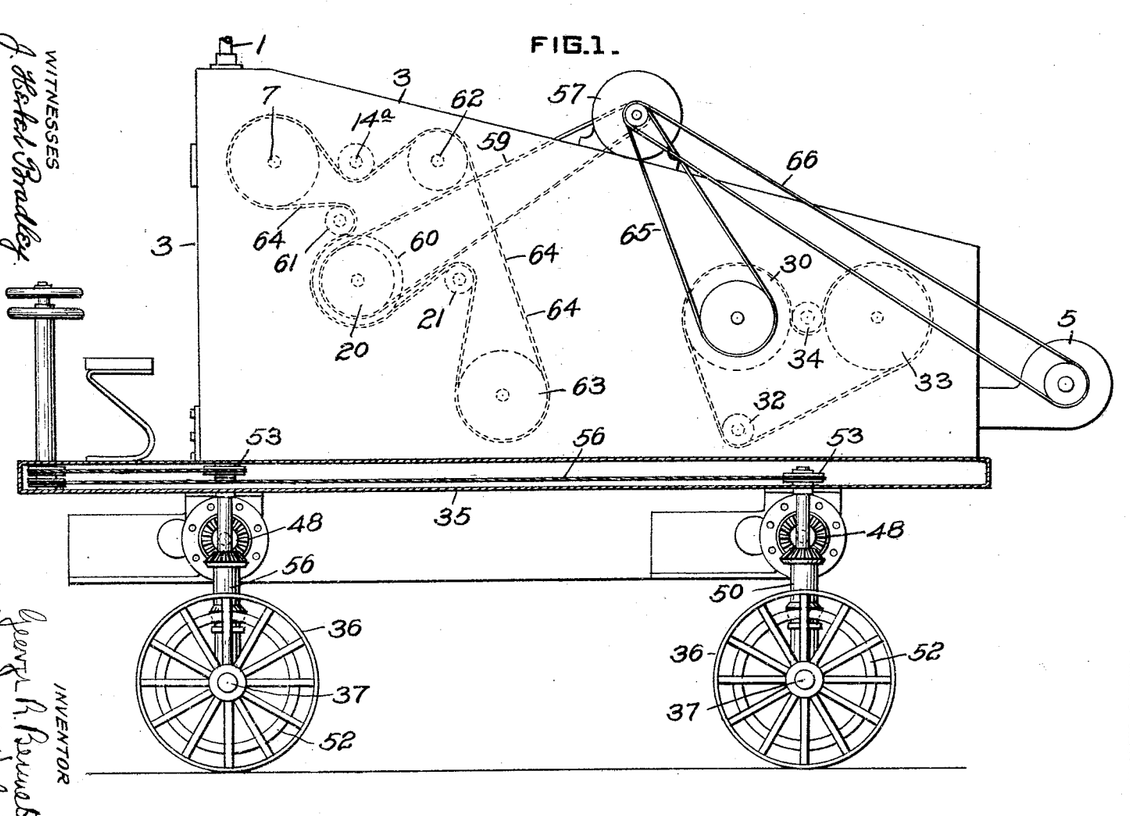
Figure 1 is a side elevation of my improved cotton picking and cleaning machine.
Figure 2:
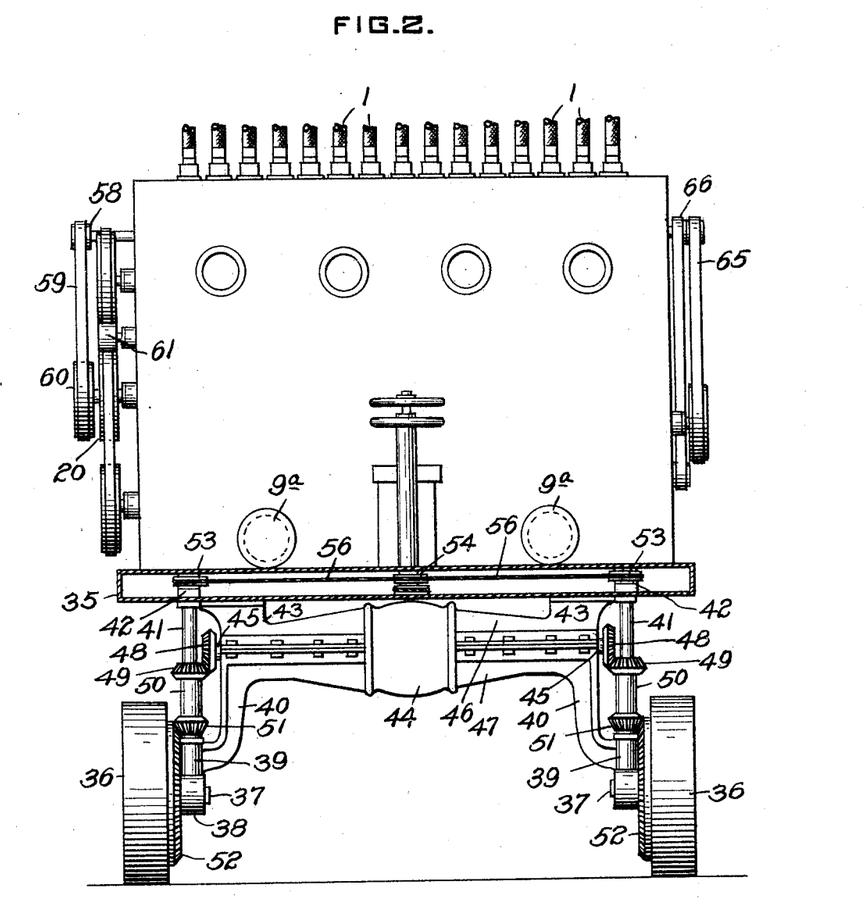
Fig. 2 is a front elevation of the same.
Figure 3:
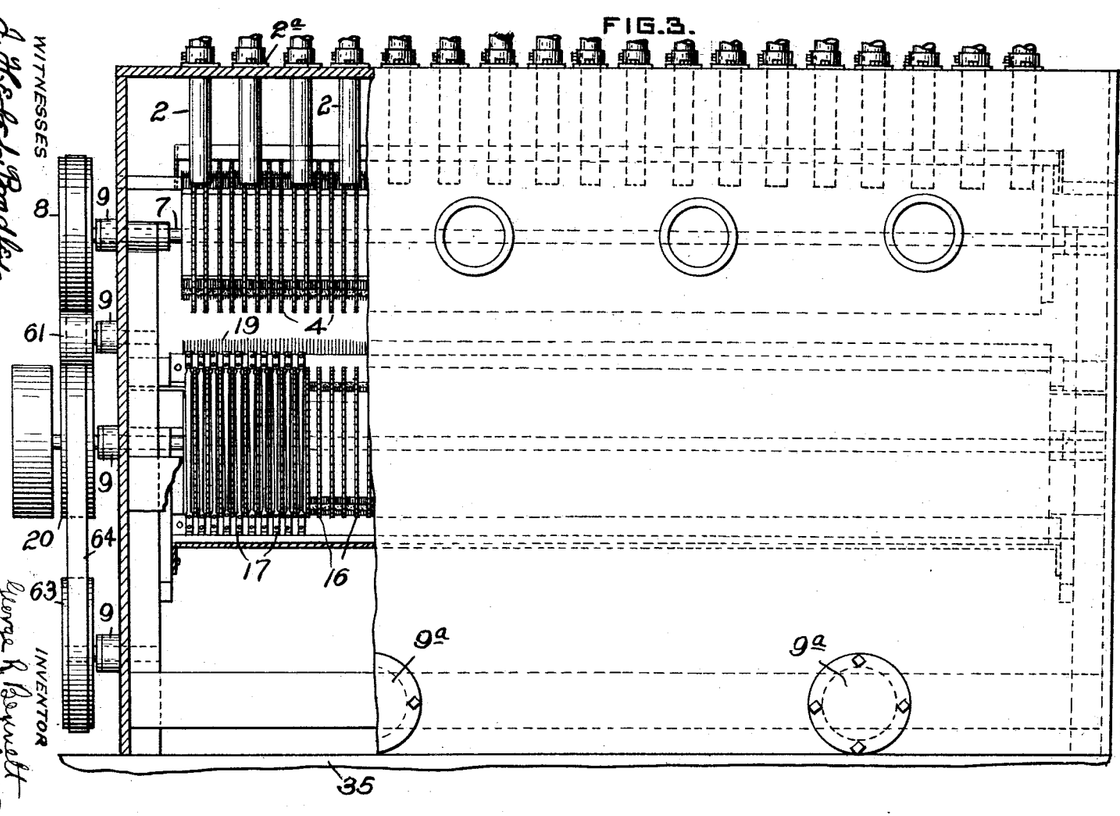
Fig. 3 is a front elevation on an enlarged scale of the mechanism, the carrying truck being omitted, and a portion of the front wall of the inclosing shell or case being broken away.
Figure 4:
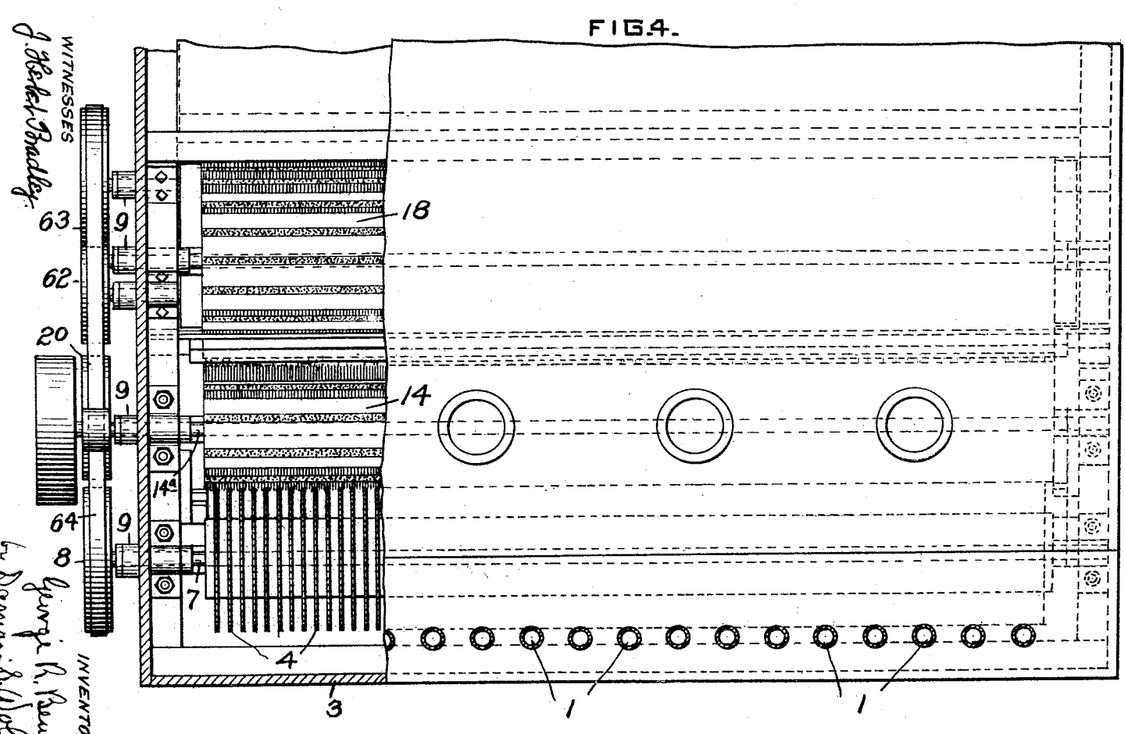
Fig 4 is a top plan view, a portion of the top of the shell being broken away.

The picking and cleaning mechanism hereinbefore described is designed to be carried through the fields of cotton so as to enable the picking hose to be brought approximately to the cotton bolls, and hence the mechanism is designed to be mounted upon a truck preferably one of the self-propelling type such for example as that shown in Figs. 1 and 2. In the construction shown herein the platform 35 is supported at such a height as to pass over the rows of plants and of any suitable width. The wheels 36 are rotatably mounted on short stud shafts 37 secured to or formed on blocks 38 which serve as supports for sleeves 39 formed on or secured to brackets 40 forming portions of the frame of the machine. The wheels are shifted to change the direction of movement of the machine by means of vertical shafts 41 which pass loosely through the sleeves 39 but operatively engage the blocks 38. These vertical shafts extend up through bearings 42 and the platform 35, to which is secured castings 43, the bearings 42 being carried by the casting as shown in Fig. 1. This casting 43 embodies frames 44 forming suitable supports and inclosures for the wheel operating motors, which may be of any suitable type or construction. These motors are operatively connected to horizontal shafts 45 which are inclosed in sleeves formed of semicircular members 46 and 47, the upper member 46 being preferably formed integral with the castings 43. The lower sections 47 of the sleeves have the brackets 40 formed integrally therewith or secured thereto. The shafts 45 have beveled pinions 48 keyed thereon, said pinions being adapted to intermesh with pinions 49 on the upper ends of sleeves 50 surrounding the shafts 41 and provided at their lower ends with beveled pinions 51 adapted to intermesh with beveled gear wheels 52 on the inner faces of the wheels 36. On the upper ends of the transmitting shafts 41 are secured pulleys 53 around which and pulleys 54 on the steering shafts 55 are passed ropes or chains 56.

In the construction shown herein a motor 57 preferably of the internal combustion type is arranged on top of the case or shell and power is transmitted to the several mechanisms through belts or chains, as for example, a pulley 58 on the shaft of the motor is connected by a belt 59 to a pulley 60 on the shaft of the ginning roll, and on the shaft of the same roll is secured a pulley 20 around which and pulleys on the shaft 7, journal 14ª of the cleaning members, the pulley 21 of the doffing roll 18 and guide pulleys 61, 62 and 63 is arranged a belt 64. Pulleys for driving the baling mechanism and the exhaust apparatus are preferably on the portion of the shaft of the motor opposite that on which the pulley 58 is secured and said pulleys are connected by belts 65 and 66 to pulleys on the shafts of the baling and vacuum mechanisms.

In the operation of pneumatic picking mechanisms a constant stream of air through the picking nozzles is maintained so that not only the lint is drawn from each boll through the nozzle when the nozzle is placed in proximity of the boll, but as the nozzle is moved from boll to boll it will inevitably be brought into such proximity to other parts of the plants that leaves, burs, etc., will also be drawn into the machine. In the picking machines heretofore used both the lint and the leaves, although picked up in succession and maintained in spaced relation due to successive picking up as above stated are carried through the machine and finally discharged into a common receptacle. It is a characteristic of the improvement claimed herein that advantage is taken of the intervals between gathers of lint and the leaves, etc., picked up as the nozzle is moved from boll to boll, to remove such leaves, etc., from the path of movement of the lint, immediately as the lint is discharged from the picking hose or pipe, so that only such leaves, etc., as may enter the picking nozzle, together with the lint has to be separated therefrom during subsequent treatment of the lint.

I claim herein as my invention:

1. The method of picking and cleaning cotton herein described which consists in removing the lint from a boll by a rapidly moving stream of air, causing such gather of lint to move laterally from such stream of air.

2. The method of picking and cleaning cotton herein described which consists in removing the lint from the boll by the action of a rapidly moving stream of air, causing such gather of lint to move laterally from such stream and then ginning the lint to remove the seed.

3. The method of picking and cleaning cotton herein described which consists in removing the lint from a boll by a rapidly moving current of air and then withdrawing the lint from such stream in a direction at an angle and opposite to the movement of the stream or current of air.

4. In a mechanism for treating cotton the combination of a gathering nozzle, a plurality of rotatable toothed disks, and means for creating a current of air through the nozzle and directing such current in proximity to the peripheries of the disks and in a direction opposed to the rotation of the disks.

5. In a mechanism for cleaning cotton the combination of a plurality of rotatable toothed disks, a rotatable doffing roll for removing lint from said disks, a ginning mechanism arranged for receiving lint from the doffing roll, a substantially air tight case or shell inclosing said mechanisms, a feed nozzle projecting into said case or shell and having its discharge end in proximity to the peripheries of the toothed disks, a gathering device, means for connecting the gathering device to the nozzle, and a vacuum apparatus so connected to the case or shell as to cause a comparatively rapid inflow of air through the nozzle and to maintain a current of air in the direction of movement of the lint from the nozzle through said mechanisms.

6. In a mechanism for cleaning cotton the combination of a plurality of rotatable toothed disks, a doffing roll for removing lint from said disks, a ginning mechanism arranged to receive the lint from the doffing roll, a baling mechanism, a substantially air tight case or shell inclosing said mechanisms, a feed nozzle projecting into said case or shell and having its discharge end in proximity to the peripheries of the toothed disks, a gathering device, means for connecting the gathering device to the nozzle, a vacuum apparatus so connected to the case or shell as to cause a comparatively rapid inflow of air through the nozzle, and to maintain a current of air through the case or shell and baffles so arranged that the main flow of air will coincide with the direction of movement of lint through the cleaning and ginning mechanisms to the baling mechanism.

7. The method herein described of treating cotton which consists in effecting a movement of segregated gathers of lint and while the gathers are segregated, separating the foreign materials from the lint.

8. The method of treating cotton described herein which consists in effecting a movement of segregated gathers of lint, removing the leaves gathered with and adherent to the individual gathers from the path of movement of such individual gathers and ginning the segregated gathers.

9. The method herein described of treating cotton which consists in removing the lint from bolls, separating the lint of individual gathers from foreign materials adherent thereto and finally massing the clean lint to form a bale or package.

10. The combination of means for causing an onward movement of individual gathers from bolls of cotton and means for removing foreign materials carried by the individual gathers from the path of movement of the gathers while segregated.

11. The combination of means for causing an onward movement of individual gathers from cotton bolls, means effective at an angle to the direction of movement of such gathers for effecting the separation of the lint and foreign materials composing the individual gathers.

12. The combination of means for causing an onward movement of individual gathers from cotton bolls, means operative at an angle to the direction of movement of the gathers for effecting a separation of the lint and foreign materials composing the individual gathers and means for ginning the gathers.

13. The combination of means for removing gathers from cotton bolls, means for individually treating the gathers to separate the foreign materials from the lint of such gathers and means for massing the cleaned lint of the separate gathers to form a bundle or package.

14. In a mechanism for treating cotton, the combination of a gathering or picking nozzle, a plurality of rotatable toothed disks and means for creating a current of air in through the nozzle and directing such current of air in such operative relation to the toothed disks that lint carried by the air may be caught by the toothed disks and separated from the leaves and other foreign materials carried through the nozzle by the air.

15. In a mechanism for picking cotton the combination of a pneumatic device for gathering lint from bolls, a receptacle for the lint, means intermediate the gathering device and the receptacle for removing from the lint foreign material entering through the gathering device and a vacuum mechanism for creating a current of air through the gathering device, cleaning means and receptacle.

16. In a mechanism for picking cotton, the combination of a pneumatic device for gathering lint from bolls, a receptacle for the lint, a ginning mechanism, means intermediate the gathering device and the ginning mechanism for removing the lint from the foreign materials entering through the gathering device and means for creating a current of air through the gathering device, the cleaning means, ginning mechanism and receptacle.

In testimony whereof, I have hereunto set my hand.

GEORGE R. BENNETT.